(12) United States Patent
Liu et al.

(10) Patent No.: US 10,009,651 B2
(45) Date of Patent: Jun. 26, 2018

(54) METHOD FOR PROCESSING GLOBAL KEY OF SMART TELEVISION AND SYSTEM THEREOF

(71) Applicant: SHENZHEN TCL DIGITAL TECHNOLOGY LTD., Shenzhen, Guangdong (CN)

(72) Inventors: Yuanfeng Liu, Guangdong (CN); Kang He, Guangdong (CN)

(73) Assignee: SHENZHEN TCL DIGITAL TECHNOLOGY LTD., Shenzhen, Guangdong (CN)

( * ) Notice: Subject to any disclaimer, the term of this patent is extended or adjusted under 35 U.S.C. 154(b) by 0 days. days.

(21) Appl. No.: 15/536,137

(22) PCT Filed: Dec. 25, 2014

(86) PCT No.: PCT/CN2014/095015
§ 371 (c)(1),
(2) Date: Jun. 15, 2017

(87) PCT Pub. No.: WO2016/095256
PCT Pub. Date: Jun. 23, 2016

(65) Prior Publication Data
US 2017/0353762 A1    Dec. 7, 2017

(30) Foreign Application Priority Data

Dec. 15, 2014  (CN) .......................... 2014 1 0778434

(51) Int. Cl.
H04N 7/173      (2011.01)
H04N 21/443     (2011.01)
(Continued)

(52) U.S. Cl.
CPC ..... *H04N 21/443* (2013.01); *H04N 21/42204* (2013.01); *H04N 21/818* (2013.01)

(58) Field of Classification Search
CPC combination set(s) only.
See application file for complete search history.

(56) References Cited

U.S. PATENT DOCUMENTS 8,429,707 B2*  4/2013  Patel ...................... G06F 21/10
                                                  725/133
9,060,152 B2*  6/2015  Sirpal ..................... G06F 3/017
9,854,320 B2*  12/2017  Zheng ................ H04N 21/4821

FOREIGN PATENT DOCUMENTS

CN          103634636 A     3/2014

* cited by examiner

*Primary Examiner* — Mulugeta Mengesha
(74) *Attorney, Agent, or Firm* — Winston Hsu

(57) ABSTRACT

The present disclosure provides a method for processing a global key of a smart television, in the method, a system side intercepts a detected remote controller key event; when it is determined that the remote controller key event needs to be sent to an application in a broadcast form, the system side generates a broadcast message according to the remote controller key event, and broadcasts the broadcast message; the application preregistering broadcast in the application side receives the broadcast message; when the application which has received the broadcast message determines that the global key processing is needed, a global key processing is conducted according to the remote controller key event in the broadcast message. The present disclosure provides a system for processing a global key of a smart television. The present disclosure can realize the function of processing the global key in any application.

14 Claims, 3 Drawing Sheets

(51) Int. Cl.
*H04N 21/422* (2011.01)
*H04N 21/81* (2011.01)

METHOD FOR PROCESSING GLOBAL KEY OF SMART TELEVISION AND SYSTEM THEREOF

FIELD OF THE DISCLOSURE

The present disclosure relates to the field of smart television, and in particular, to a method for processing a global key of a smart television and a system thereof.

BACKGROUND OF THE DISCLOSURE

With the more and more widely applying of Android smart operating system, many smart televisions also use the Android smart operating systems, which derives applications having high playability and needing user interactive operating. The existing Android smart television can only process a global key in a framework of a system, cannot realize the function of managing the global key in the application.

SUMMARY OF THE DISCLOSURE

The main aim of the present disclosure is to provide a method for processing a global key of a smart television and a system thereof, which aims to solve the technical problem of that the existing Android smart television cannot realize the function of managing the global key in the application.

In order to achieve the above aim, the present disclosure provides a method for processing a global key of a smart television, which includes the following steps:

intercepting a detected remote controller key event by a system side;

generating a broadcast message by the system side according to the remote controller key event, and broadcasting the broadcast message when determining that the remote controller key event needs to be sent to an application in a broadcast form;

receiving the broadcast message by an application preregistering broadcast in an application side; and conducting a global key processing according to the remote controller key event in the broadcast message when the application which having received the broadcast message determining that the global key processing being needed.

Preferably, before the step of generating a broadcast message by the system side according to the remote controller key event, and broadcasting the broadcast message when determining that the remote controller key event needs to be sent to an application in a broadcast form, further includes:

acquiring a key value of the remote controller key event;

determining the remote controller key event need to be sent to the application in the broadcast form if the key value is a preset key value for processing the remote controller key event in the application; and determining the remote controller key event need to be processed by a system if the key value is a preset key value for processing the remote controller key event in the system.

Preferably, after the step of determining the remote controller key event need to be processed by a system if the key value is a preset key value for processing the remote controller key event in the system, further includes:

processing the remote controller key event by the system side.

Preferably, the method for processing a global key of a smart television wherein further includes:

receiving the broadcast message by an application having the highest broadcast priority in applications preregistering broadcast first when a plurality of applications preregister broadcast in the application side;

sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

Preferably, the step of generating a broadcast message by the system side according to the remote controller key event, and broadcasting the broadcast message when determining that the remote controller key event needing to be sent to an application in a broadcast form includes:

generating the broadcast message with a key identifier corresponding to the remote controller key event and broadcasting by the system side, when it is determined that the remote controller key event needs to be sent to the application in broadcast form.

Preferably, before the step of conducting a global key processing according to the remote controller key event in the broadcast message when the application which having received the broadcast message determining that the global key processing being needed, further includes:

determining whether a key identifier of the broadcast message is consistent with a key identifier of registering broadcast by the application receiving the broadcast message;

if yes, determining that the global key processing is needed; and if no, determining that the global key processing is not needed.

In addition, in order to achieve the above aim, the present disclosure also provides a system for processing a global key of a smart television, which includes:

a system side, is used for intercepting a detected remote controller key event; when it is determined that the remote controller key event needs to be sent to an application in a broadcast form, the system side generates a broadcast message according to the remote controller key event, and broadcasts the broadcast message; and an application side, includes an application preregistering broadcast, the application preregisters broadcast receives the broadcast message; when the application which having received the broadcast message determines that a global key processing is needed, the global key processing is conducted according to the remote controller key event in the broadcast message.

Preferably, the system side is also used for:

acquiring a key value of the remote controller key event;

determining the remote controller key event need to be sent to the application in the broadcast form if the key value is a preset key value for processing the remote controller key event in the application; and determining the remote controller key event need to be processed by a system if the key value is a preset key value for processing the remote controller key event in the system.

The system side is also used for:

processing the remote controller key event by the the system side when it is determined that the remote controller key event needs to be processed by the system.

Preferably, the application side is also used for: receiving the broadcast message by an application having the highest broadcast priority in applications preregistering broadcast when a plurality of applications preregister broadcast in the application side; sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

Preferably, the system side is also used for:

generating the broadcast message with a key identifier corresponding to the remote controller key event and broadcasting by the system side when determining that the remote controller key event needs to be sent to the application in the broadcast form.

Preferably, the application side is also used for:

determining whether a key identifier of the broadcast message is consistent with a key identifier of registering broadcast by the application receiving the broadcast message;

if yes, determining that the global key processing is needed; and if no, determining that the global key processing is not needed.

The method for processing the global key of the smart television provided by the present disclosure, the system side intercepts the detected remote controller key event; when determining that the remote controller key event needs to be sent to an application in a broadcast form, the system side generates a broadcast message according to the remote controller key event, and broadcasts the broadcast message; the application preregistering broadcast in the application side receives the broadcast message; when the application which has received the broadcast message determines that the global key processing is needed, a global key processing is conducted according to the remote controller key event in the broadcast message. The method for processing the global key of the smart television provided by the present disclosure can realize the function of processing the global key in any application.

The realizing of the aim, functional characteristics, advantages of the present disclosure are further described in detail with reference to the accompanying drawings and the embodiments.

DETAILED DESCRIPTION OF THE EMBODIMENTS

It is to be understood that, the described embodiments are only some exemplary embodiments of the present disclosure, and the present disclosure is not limited to such embodiments.

The present disclosure provides a method for processing a global key of a smart television.

Figure 1:
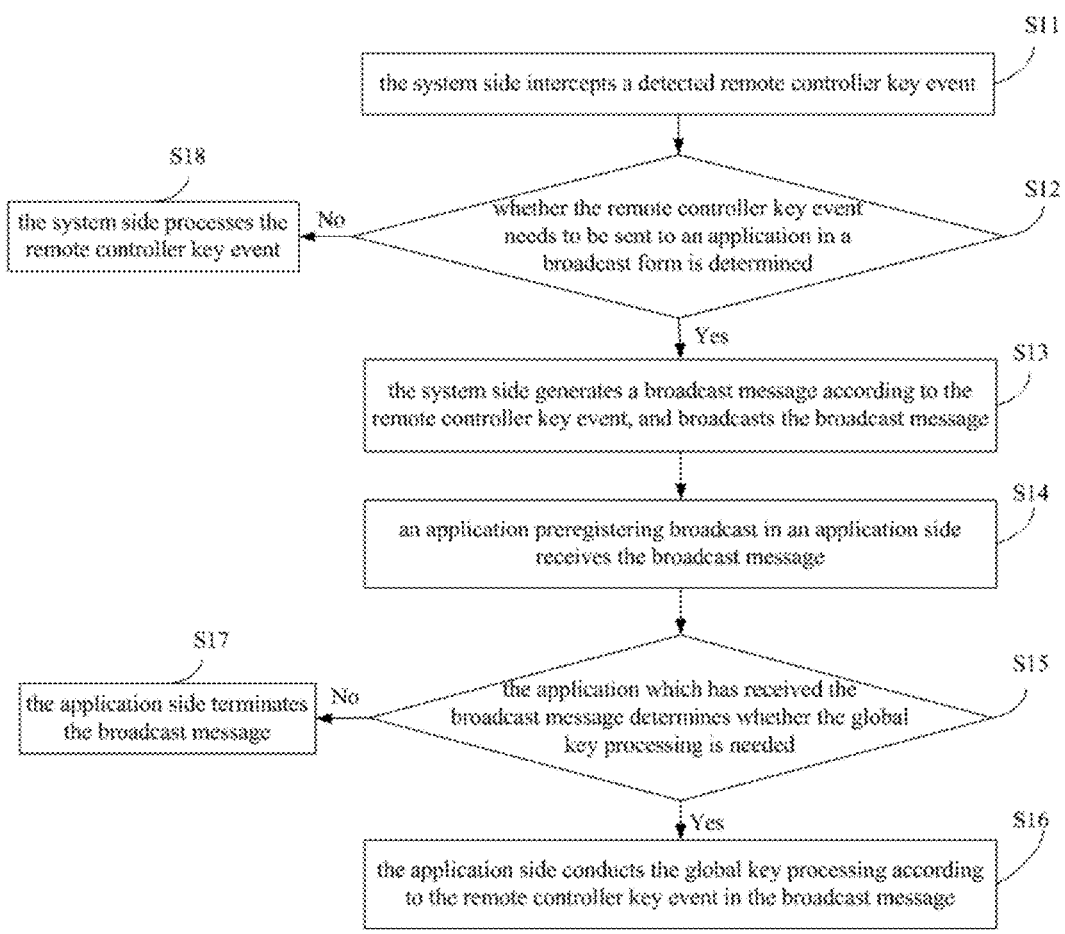
FIG. 1 is a flowchart of a method for processing the global key of the smart television of the present disclosure according to an exemplary embodiment.

Referring to FIG. 1, FIG. 1 is a flowchart of the method for processing the global key of the smart television of the present disclosure according to an exemplary embodiment.

In an exemplary embodiment, the method for processing the global key of the smart television includes the following steps:

Step S11, the system side intercepts a detected remote controller key event.

In an exemplary embodiment, taking an Android small television as an example to illustrate the global key processing method. After a user operates a key of a remote controller of the Android small television, that is, after a remote controller key event occurs, Phone Window Manager of Android system intercepts the remote controller key event.

Step S12, whether the remote controller key event needs to be sent to an application in a broadcast form is determined; if yes, go to step S13; if no, go to step S18;

When the step S11 intercepts the remote controller key event, whether the remote controller key event needs to be sent to an application of the Android small television in the broadcast form is determined; if it is determined that the remote controller key event needs to be sent to the application in the broadcast form, go to step S13; if no, go to step S18.

Step S13, the system side generates a broadcast message according to the remote controller key event, and broadcasts the broadcast message;

When it is determined that the remote controller key event needs to be sent to the application in the broadcast form, the system side generates the broadcast message according to the remote controller key event, and broadcasts the broadcast message to the application of the application side.

Step S14, an application preregistering broadcast in the application side receives the broadcast message;

In step S13, after the system side broadcasts the broadcast message of the remote controller key event, a configuration file of an application in the applications of the Android smart television registers a static broadcast, the application can receives the broadcast message.

Step S15, the application receiving the broadcast message determines whether the global key processing is needed; if yes, go to step S16; if no, go to step S17;

After the application in the applications of the Android smart television whose configuration file registers the static broadcast receives the broadcast message, the application side determines whether the global key processing is needed; if it is determined that the global key processing is needed, go to step S16; or go to step S17.

Step S16, the application side conducts the global key processing according to the remote controller key event in the broadcast message.

After the application in the applications of the Android smart television whose configuration file registers the static broadcast receives the broadcast message, if it is determined that the global key processing is needed, the global key processing is conducted according to the remote controller key event in the broadcast message.

Step S17, the application side terminates the broadcast message.

After the application in the applications of the Android smart television whose configuration file registers the static broadcast receives the broadcast message, if it is determined that the global key processing is not needed, broadcast message is terminated.

Step S18, the system side processes the remote controller key event.

When it is determined that the remote controller key event needs to be processed by the system, the global key processing is conducted in a framework of a system.

The method for processing the global key of the smart television provided by the present disclosure, the system side intercepts a detected remote controller key event by a system side; whether the remote controller key event needs to be sent to the application in the broadcast form is determined; if yes, the system side generates the broadcast message according to the remote controller key event, and broadcasts the broadcast message; if no, the system side conducts the remote controller key event; the application preregistering broadcast in the application side receives the broadcast message; the application receiving the broadcast message determines whether the global key processing is needed; if it is determined that the global key processing is needed, the global key processing is conducted according to the remote controller key event in the broadcast message; or, the application side ends the broadcast message. The method for processing the global key of the smart television provided by the present disclosure can realize the function of processing the global key in any application.

Furthermore, the step S12 includes:

Step S121, a key value of the remote controller key event is acquired;

Before conducting step S11, the system pre-configures a key value for each remote controller key event, and presets a key value for the remote controller key event processed in the Android smart television applications. After step S11 intercepts the remote controller key event, the key value of the remote controller key event is acquired.

Step S122, if the key value is the preset key value for processing the remote controller key event in the application, it is determined that the remote controller key event needs to be sent to the application in the broadcast form, go to step S13;

If the key value is a preset key value for processing the remote controller key event in the system, it is determined that the remote controller key event needs to be processed by the system, go to step S18.

if the key value of the remote controller key event is the preset key value for processing the remote controller key event in the Android smart television application, it is determined that the remote controller key event needs to be sent to the application in the broadcast form, go to step S13; If the key value of the remote controller key event is a preset key value for processing the remote controller key event in the Android smart television system, it is determined that the remote controller key event needs to be processed by the system, go to step S18.

Furthermore, the step S13 includes:

Step S131, the system side generates the broadcast message with a key identifier corresponding to the remote controller key event.

When it is determined that the remote controller key event needs to be sent to the application of Android smart television in broadcast form, a corresponding key identifier is added to the broadcast of the remote controller key event needing to be sent to the application in the broadcast form, for generating the broadcast message bringing the key identifier.

Step S132, the system side broadcasts the broadcast message.

The system side broadcasts the broadcast message bringing the key identifier, so that the application in the applications of the Android smart television whose configuration file registers the static broadcast receives the broadcast message Furthermore, the step S15 includes:

Step S151, the application receiving the broadcast message acquires the key identifier of the broadcast message;

After the application of the Android smart television receives the broadcast message, acquires the key identifier of the broadcast message of the remote controller key event.

Step S152, whether the key identifier of the broadcast message is consistent with a key identifier of registering broadcast is determined; if yes, it is determined that the global key processing is needed, go to step S16; if no, it is determined that the global key processing is not needed, go to step S17.

Whether the key identifier of the broadcast message acquired by Android smart television application is consistent with the key identifier of registering broadcast of Android smart television application is determined; if the key identifier of the broadcast message acquired by Android smart television application is consistent with the key identifier of registering broadcast of Android smart television application, it is determined that the global key processing is needed, go to step S16; if not, it is determined that the global key processing is not needed, go to step S17.

Figure 2:
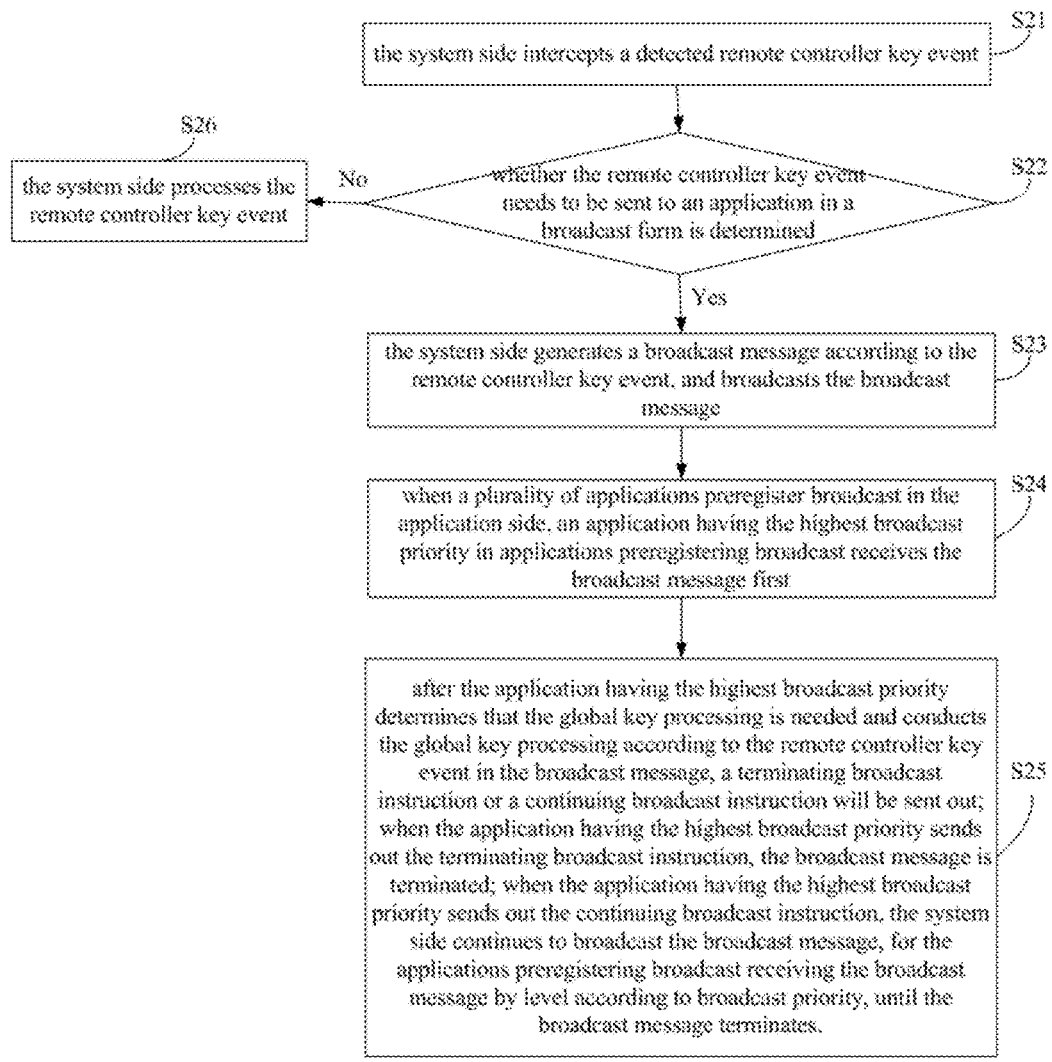
FIG. 2 is a flowchart of a method for processing the global key of the smart television of the present disclosure according to another exemplary embodiment.

Furthermore, referring to FIG. 2, FIG. 2 is a flowchart of the method for processing the global key of the smart television of the present disclosure according to another exemplary embodiment;

In the another exemplary embodiment, the method for processing the global key of the smart television includes the following steps:

Step S21, the system side intercepts a detected remote controller key event;

In detail, the step of that the system side intercepts a detected remote controller key event can referred to the above exemplary embodiment, no need to be repeated again.

Step S22, whether the remote controller key event needs to be sent to an application in a broadcast form is determined; if yes, go to step S23; if no, go to step S26;

When the step S21 intercepts the remote controller key event, whether the remote controller key event needs to be sent to an application of the Android small television in the broadcast form is determined; if it is determined that the remote controller key event needs to be sent to the application in the broadcast form, go to step S23; if no, go to step S26.

Step S23, the system side generates a broadcast message according to the remote controller key event, and broadcasts the broadcast message;

When it is determined that the remote controller key event needs to be sent to the application in the broadcast form, the system side generates the broadcast message according to the remote controller key event, and broadcasts the broadcast message to the application of the application side.

Step S24, when a plurality of applications preregister broadcast in the application side, an application having the highest broadcast priority in applications preregistering broadcast receives the broadcast message first;

when a plurality of Android smart television applications preregister broadcast, the broadcast priority of the applications can be set according to using frequency of the Android smart television applications, that is, the frequency used application has high broadcast priority, the low frequency used application has low broadcast priority. Android smart television applications receive the broadcast message according to the level of broadcast priority, the application having high broadcast priority receives the broadcast message first, the application having low broadcast priority receives the broadcast message later. After the system side broadcasts the broadcast message, the application having the highest broadcast priority in applications preregistering broadcast receives the broadcast message first.

Step S25, after the application having the highest broadcast priority determines that the global key processing is needed and conducts the global key processing according to the remote controller key event in the broadcast message, a terminating broadcast instruction or a continuing broadcast instruction will be sent out;

When the application having the highest broadcast priority sends out the terminating broadcast instruction, the broadcast message is terminated; and When the application having the highest broadcast priority sends out the continuing broadcast instruction, the system side continues to broadcast the broadcast message, for the applications preregistering broadcast receiving the broadcast message by level according to broadcast priority, until the broadcast message terminates.

After the application having the highest broadcast priority receives the broadcast message first, the application having the highest broadcast priority acquires the key identifier of the broadcast message, then whether the acquired key identifier is consistent with a key identifier of registering broadcast of application having the highest broadcast priority is determined, if the key identifier of the broadcast message acquired by application having the highest broadcast priority is consistent with the key identifier of registering broadcast, it is determined that the global key processing is needed; if the key identifier of the broadcast message acquired by application having the highest broadcast priority is not consistent with the key identifier of registering broadcast, it is determined that the global key processing is not needed. When it is determined that the global key processing is needed, the application having the highest broadcast priority conducts the global key processing according to remote controller key event in the acquired broadcast message.

After the application having the highest broadcast priority conducts the global key processing, the application having the highest broadcast priority will send out a terminating broadcast instruction or a continuing broadcast instruction.

When the application having the highest broadcast priority sends out the terminating broadcast instruction, the broadcast message is terminated. At this time, the applications of the Android smart television which have low broadcast priority cannot receive the broadcast message.

When the application having the highest broadcast priority sends out the continuing broadcast instruction, the broadcast message is issued to the application of Android smart television having a next priority, for the applications pre-registering broadcast receiving the broadcast message by level according to broadcast priority, until the broadcast message ends.

Step S26, the system side processes the remote controller key event.

When it is determined that the remote controller key event needs to be processed by the system side, the global key processing is conducted in a framework of the system.

The method for processing the global key of the smart television provided by the present disclosure, sets broadcast priority for the applications registering static broadcast, for realizing the function of processing the global key according to the broadcast priority in the applications.

Figure 3:
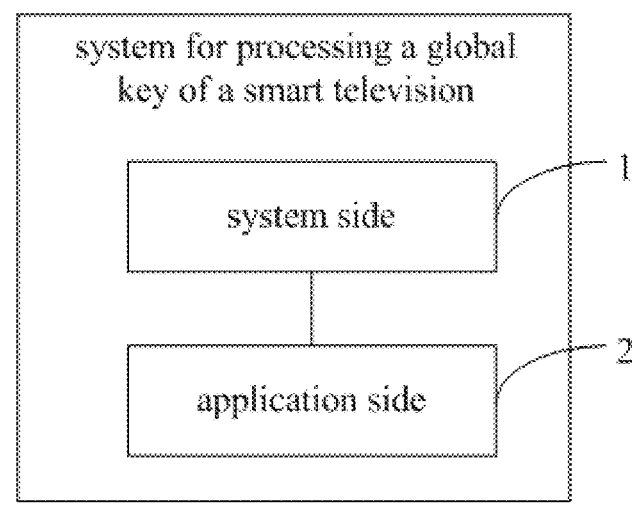
FIG. 3 is a block diagram of a system for processing the global key of the smart television of the present disclosure.

The present disclosure further provides a system for processing the global key of the smart television of the present disclosure. Referring to FIG. 3, FIG. 3 is a block diagram of the system for processing the global key of the smart television of the present disclosure. The system for processing the global key of the smart television of the present disclosure includes:

a system side 1, is used for intercepting a detected remote controller key event; when it is determined that the remote controller key event needs to be sent to an application in a broadcast form, the system side generates a broadcast message according to the remote controller key event, and broadcasts the broadcast message; and an application side 2, includes an application preregistering broadcast, the application preregistering broadcast receives the broadcast message; when the application which has received the broadcast message determines that a global key processing is needed, the global key processing is conducted according to the remote controller key event in the broadcast message.

After the system side 1 intercepts the detected remote controller key event, the system side 1 determines whether the remote controller key event needs to be sent to the application in broadcast form, when it is determined that the remote controller key event needs to be sent to the application in broadcast form, the system side generates the broadcast message according to the remote controller key event, and broadcasts the broadcast message. The application side 2 includes the application preregistering broadcast, after the application preregistering broadcast receives the broadcast message, whether the global key processing is needed is determined, when it is determined that the global key processing is needed, the global key processing is conducted according to the remote controller key event in the broadcast message.

In detail, the system side 1 is also used for:

acquiring a key value of the remote controller key event;

determining the remote controller key event need to be sent to the application in the broadcast form if the key value is a preset key value for processing the remote controller key event in the Android smart television application; and determining the remote controller key event need to be processed by the system if the key value is a preset key value for processing the remote controller key event in the Android smart television system.

In detail, the system side 1 is also used for:

generating the broadcast message with a key identifier corresponding to the remote controller key event and broadcasting, when it is determined that the remote controller key event needs to be sent to the application in the broadcast form.

In detail, the application side 2 is also used for:

determining whether a key identifier of the broadcast message is consistent with a key identifier of registering broadcast by the application receiving the broadcast message;

if yes, determining that the global key processing is needed; and if no, determining that the global key processing is not needed.

The detail working process of each function module of the system for processing the global key of the smart television can be referred to the exemplary embodiment of the method, no need to be repeated again.

The system for processing the global key of the smart television provided by the exemplary embodiment, the system side 1 intercepts the detected remote controller key event; when it is determined that the remote controller key event needs to be sent to the application in broadcast form, the system side 1 generates the broadcast message according to the remote controller key event, and broadcasts the broadcast message; the application side 2 includes the application preregistering broadcast, the application preregistering broadcast receives the broadcast message; when the application preregistering broadcast which has received the broadcast message determines that the global key processing is needed, the global key processing is conducted according to the remote controller key event in the broadcast message. The system for processing the global key of the smart television of the exemplary embodiment realizes the function of processing the global key in any application.

Furthermore, the application side 2 of the system for processing the global key of the smart television is also used for:

when a plurality of applications preregister broadcast in the application side, an application having the highest broadcast priority in applications preregistering broadcast receives the broadcast message first; the application having the highest broadcast priority determines that the global key processing is needed, and conducts the global key processing according to the remote controller key event in the broadcast message, a terminating broadcast instruction or a continuing broadcast instruction will be sent out;

When the application having the highest broadcast priority sends out the terminating broadcast instruction, the broadcast message is terminated;

When the application having the highest broadcast priority sends out the continuing broadcast instruction, the system side continues to broadcast the broadcast message, for the applications preregistering broadcast receiving the broadcast message by level according to broadcast priority.

when a plurality of Android smart television applications preregister broadcast, the broadcast priority of the applications can be set according to using frequency of the Android smart television applications, that is, the frequency used application has high broadcast priority, the low frequency used application has low broadcast priority. So that, Android smart television applications receive the broadcast message according to the level of broadcast priority, the application having high broadcast priority receives the broadcast message first, the application having low broadcast priority receives the broadcast message later.

After the application having the highest broadcast priority receives the broadcast message, the application having the highest broadcast priority acquires the key identifier of the broadcast message, then whether the acquired key identifier is consistent with a key identifier of registering broadcast of Android smart television application is determined, if the key identifier of the broadcast message acquired by application having the highest broadcast priority is consistent with the key identifier of registering broadcast, it is determined that the global key processing is needed; if the key identifier of the broadcast message acquired by application having the highest broadcast priority is not consistent with the key identifier of registering broadcast, it is determined that the global key processing is not needed. When it is determined that the global key processing is needed, the application having the highest broadcast priority conducts the global key processing according to remote controller key event in the acquired broadcast message.

After the application having the highest broadcast priority conducts the global key processing, the application having the highest broadcast priority will send out a terminating broadcast instruction or a continuing broadcast instruction.

When the application having the highest broadcast priority sends out the terminating broadcast instruction, the broadcast message is terminated. At this time, the applications of the Android smart television which have low broadcast priority cannot receive the broadcast message.

When the application having the highest broadcast priority sends out the continuing broadcast instruction, the broadcast message is issued to the application of Android smart television having a next priority, for the applications preregistering broadcast receiving the broadcast message by level according to broadcast priority, until the broadcast message ends. The system for processing the global key of the smart television provided by the exemplary embodiment realizes the function of processing the global key according to the broadcast priority in the applications.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

What is claimed is:

1. A method for processing a global key of a smart television, comprising the following steps: intercepting a detected remote controller key event by a system side;

generating a broadcast message by the system side according to the remote controller key event, and broadcasting the broadcast message when determining that the remote controller key event needing to be sent to an application in a broadcast form; wherein before the step of generating a broadcast message by the system side according to the remote controller key event, and broadcasting the broadcast message when determining that the remote controller key event needing to be sent to an application in a broadcast form, further comprises:

acquiring a key value of the remote controller key event;

determining the remote controller key event need to be sent to the application in the broadcast form if the key value is a preset key value for processing the remote controller key event in the application; and determining the remote controller key event need to be processed by a system if the key value is a preset key value for processing the remote controller key event in the system;

receiving the broadcast message by an application preregistering broadcast in an application side; and conducting a global key processing according to the remote controller key event in the broadcast message when the application which having received the broadcast message determining that the global key processing being needed.

2. The method for processing a global key of a smart television of claim 1, wherein after the step of determining the remote controller key event need to be processed by a system if the key value is a preset key value for processing the remote controller key event in the system, further comprises:

processing the remote controller key event by the system side.

3. The method for processing a global key of a smart television of claim 1, wherein further comprises:

receiving the broadcast message by an application having the highest broadcast priority in applications preregistering broadcast first when a plurality of applications preregister broadcast in the application side;

sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

4. The method for processing a global key of a smart television of claim 1, wherein further comprises:

receiving the broadcast message by an application having the highest broadcast priority in applications preregistering broadcast first when a plurality of applications preregister broadcast in the application side;

sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

5. The method for processing a global key of a smart television of claim 1, wherein the step of generating a broadcast message by the system side according to the remote controller key event, and broadcasting the broadcast message when determining that the remote controller key event needing to be sent to an application in a broadcast form comprises:

generating the broadcast message with a key identifier corresponding to the remote controller key event and broadcasting by the system side.

6. The method for processing a global key of a smart television of claim 5, wherein before the step of conducting a global key processing according to the remote controller key event in the broadcast message when the application which having received the broadcast message determining that the global key processing being needed, further comprises:

determining whether a key identifier of the broadcast message is consistent with a key identifier of registering broadcast by the application receiving the broadcast message; if yes, determining that the global key processing is needed; and if no, determining that the global key processing is not needed.

7. The method for processing a global key of a smart television of claim 5, wherein further comprises:

receiving the broadcast message by an application having the highest broadcast priority in applications preregistering broadcast first when a plurality of applications preregister broadcast in the application side;

sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

8. A system for processing a global key of a smart television, comprising:

a system side, being used for intercepting a detected remote controller key event; when determining that the remote controller key event needing to be sent to an application in a broadcast form, the system side generating a broadcast message according to the remote controller key event, and broadcasting the broadcast message; wherein the system side is also used for:

acquiring a key value of the remote controller key event;

determining the remote controller key event need to be sent to the application in the broadcast form if the key value is a preset key value for processing the remote controller key event in the application; and determining the remote controller key event need to be processed by a system if the key value is a preset key value for processing the remote controller key event in the system and an application side, comprising an application preregistering broadcast, the application preregistering broadcast receiving the broadcast message; when the application which having received the broadcast message determining that a global key processing being needed, the global key processing being conducted according to the remote controller key event in the broadcast message.

9. The system for processing a global key of a smart television of claim 8, wherein the system side is also used for:

processing the remote controller key event by the system side when it is determined that the remote controller key event needs to be processed by the system.

10. The system for processing a global key of a smart television of claim 8, wherein the application side is also used for: receiving the broadcast message by an application having the highest broadcast priority in applications preregistering broadcast first when a plurality of applications preregister broadcast in the application side; sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

11. The system for processing a global key of a smart television of claim 8, wherein the application side is also used for: receiving the broadcast message by an application having the highest broadcast priority in applications preregistering broadcast first when a plurality of applications preregister broadcast in the application side; sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

12. The system for processing a global key of a smart television of claim 8, wherein the system side is also used for:

generating the broadcast message with a key identifier corresponding to the remote controller key event and broadcasting by the system side when determining that the remote controller key event needs to be sent to the application in the broadcast form.

13. The system for processing a global key of a smart television of claim 12, wherein the application side is also used for:

determining whether a key identifier of the broadcast message is consistent with a key identifier of registering broadcast by the application receiving the broadcast message; if yes, determining that the global key processing is needed; and if no, determining that the global key processing is not needed.

14. The system for processing a global key of a smart television of claim 12, wherein the application side is also used for: receiving the broadcast message by an application having the highest broadcast priority in applications preregistering broadcast first when a plurality of applications preregister broadcast in the application side; sending out a terminating broadcast instruction or a continuing broadcast instruction after the application having the highest broadcast priority determines that the global key processing is needed and conducts the global key processing according to the remote controller key event in the broadcast message;

terminating the broadcast message when the application having the highest broadcast priority sends out the terminating broadcast instruction; and continuing to broadcast the broadcast message when the application having the highest broadcast priority sends out the continuing broadcast instruction, for the applications preregistering broadcast receiving the broadcast message by level according to broadcast priority.

* * * * *